United States Patent
Hollenbeck et al.

[19]

[11] Patent Number: 5,930,304
[45] Date of Patent: Jul. 27, 1999

[54] WIRELESS POWERED COMMUNICATION DEVICE WITH ADAPTIVE DATA DETECTION AND METHOD

[75] Inventors: Neal W. Hollenbeck, Orland Park; Kenneth A. Paitl, East Dundee; Donald B. Lemersal, Jr., Park Ridge, all of Ill.

[73] Assignee: Motorola, Inc., Schaumburg, Ill.

[21] Appl. No.: 08/822,399

[22] Filed: Mar. 20, 1997

[51] Int. Cl.$^6$ .............................. H04L 27/06; H04L 27/00
[52] U.S. Cl. ............................................ 375/316; 375/259
[58] Field of Search ................................... 375/317, 320, 375/346, 352, 259, 316; 340/825.54, 825.34; 455/41; 379/55.1

[56] References Cited

U.S. PATENT DOCUMENTS

| | | | |
|---|---|---|---|
| 5,113,184 | 5/1992 | Katayama | 340/825.54 |
| 5,229,652 | 7/1993 | Hough | 307/104 |
| 5,243,625 | 9/1993 | Verbakel et al. | 375/317 |
| 5,284,151 | 2/1994 | Onoda | 600/523 |
| 5,698,838 | 12/1997 | Yamaguchi | 340/825.54 |
| 5,815,020 | 9/1998 | Allen et al. | 327/255 |

*Primary Examiner*—Stephen Chin
*Assistant Examiner*—Albert Park
*Attorney, Agent, or Firm*—Wayne J. Egan

[57] ABSTRACT

The present invention expands the range over which a wireless powered communication device (500) and device reader (12) can communicate. In the present invention, circuitry (502) within the device (500) provides for determining a characteristic of the received communication signal. Based upon this signal characteristic data recovery parameters are adapted to enhance data recovery over a maximize communication distance. In a preferred embodiment of the present invention, the magnitude of the power signal is observed. It is known that the power signal varies as an inverse square of the distance of the device (500) to the reader. From this information, a data detection threshold is adjusted to enhance data recovery.

16 Claims, 6 Drawing Sheets

WIRELESS POWERED COMMUNICATION DEVICE WITH ADAPTIVE DATA DETECTION AND METHOD

CROSS-REFERENCE TO RELATED APPLICATIONS

This is related to commonly-assigned prior application Ser. No. 08/706,064 filed Aug. 30, 1996 by inventors Lawrence Connell, Neal Hollenbeck and Kenneth Paitl, attorney docket number IND00110, now pending.

FIELD OF THE INVENTION

The present invention relates generally to wireless powered communication devices and more particularly to a wireless powered communication device having an adaptive data detection responsive to characteristics of the received communication signal.

BACKGROUND OF THE INVENTION

Smart cards, which look and feel much like ordinary credit cards, contain circuitry for communicating, processing and storing information. Smart cards have many applications, but primarily, smart cards are used for financial transactions. The smart card stores a monetary balance which is credited/debited with each transaction. Additional uses for smart cards are as identification tags for employees, etc.

To provide communication between the smart card and a card reader, smart cards have been adapted with metalized tabs on the card surface which provide a direct connection between the circuitry within the card and the card reader. With this arrangement to make a transaction, the card is inserted into a receptor slot of the card reader where reader probes contact the metalized tabs. The reader provides a controlled and filtered power supply and data signal to the smart card via the metalized tabs.

The advantage of providing the smart card with metalized tabs is that very clean, filtered and separated power and data signals may be communicated to the smart card. This ensures proper operation. However, there is a disadvantage in that the card must make contact with the card reader, i.e., the metalized tabs must contact the card reader probes. In an improved arrangement, the smart card is adapted to operate in a "contact-less" manner.

Contact-less smart cards have been proposed and implemented with success. The contact-less smart card is remotely powered and communicated with by the card reader. Typically, power to the smart card is supplied by a high frequency signal and a data carrier signal is supplied by another frequency, which is preferably divided directly from the power signal. With this arrangement, the user simply positions the smart card near the reader to perform a transaction. The card need only come within 10 or 15 centimeters (cm) of the card reader. Power and data signals are inductively coupled from the reader to the card using two tuned resonant circuits. The power coupling frequency is preferably unmodulated and spectrally pure so as not to electrically jam or interfere with any electronic equipment that operates on adjacent frequency bands. The data carrier frequency is a submultiple of the power coupling frequency and is modulated using a suitable modulation technique such as amplitude shift keying (ASK). The data carrier is coupled into the card using an inductor or coil in each of the card and the card reader. Again to avoid interference, the data carrier signal level is held to a very low level.

One problem with contact-less smart cards is recovering the data signal from the data carrier. Because of the relatively large value of the power signal as compared to the data signal there is a significant power signal component present on the data coil. This component of the power signal must be removed in order to accurately recover the data signal. Also, the rectification and regulation of the power signal to generate the power supply results in a substantial power signal frequency component on the power supplies, requiring a data carrier recovery circuit with good power supply rejection.

A prior proposed solution to this problem requires use of a high order filter which because of the proximity of the power and data signals in frequency requires many poles of filtering and a high filter gain for recovery of the data signal. In this approach, the data carrier signal is first filtered to remove the interfering power signal. Then, the data carrier signal is limited to facilitate detection of the data. In addition, this approach requires expensive, precise analog components to implement the filtering, and many stages of both filtering and gain to achieve the necessary signal rejection and gain. Furthermore, the number of components consume a considerable amount of power reducing the distance from the reader that the device may be effectively used. As a result, the proposed solution is not desirable for use in smart card devices.

Another proposed solution uses mixers to mix the input signal with a clock at the data carrier frequency. This mixed signal is then filtered and amplified to retrieve the data. This method provides improvement over the use of multi-pole filters and multiple stage gain by reducing the amount of filtering required. Still there remains a need for an efficient solution to the problem of accurately recovering the data signal in view of inherent power signal noise which is easily implemented in smart card technology.

Data detection is further hampered as a result of the variability of the characteristics of the received communication signal and particularly the strength of the received signal. As an example, in a system employing amplitude shift keying (ASK) with 100%/0% modulation (i.e., on/off keying), the bandwidth of the system limits the communication range of the card to the reader. Increasing bandwidth results in a reduction of the quality factor or "Q" of the data detection circuit, and hence limits the communication distance. Decreasing the data rate is not desirable in that it increases transmission time. The bandwidth limitation causes a spreading of the envelope of the ASK signal by filtering the transitions from "0" to "1" and from "1" to "0". Data detection in an ASK system requires a data detection threshold to determine if the signal is a "1" or a "0" taking into account this bandwidth limitation. Because of variation in the strength of the detected signal if the data detection threshold is set, for example, too low for a strong signal or too high for a small signal decoding errors will occur. Typically a fixed data detection threshold is set to provide best data detection at a set distance of the card to the reader. However, it is desirable to maximize the range over which the card and the reader may accurately exchange data.

One prior art attempt to maximize range provides for taking an average of the data levels to determine a threshold level for data detection. However, averaging requires encoding data such that there is always a transition, such as Manchester coding, which reduces the data rate by at least one half. Therefore, there remains a need for a wireless powered communication device and reader system which provides accurate data detection over a wide range of distances of card to reader.

DETAILED DESCRIPTION OF THE PREFERRED EMBODIMENTS

The present invention expands the range over which a smart card and card reader can communicate. In the present invention, circuitry within the card provides for determining a characteristic of the received communication signal. Based upon this signal characteristic data recovery parameters are adapted to maximize communication distance. In a preferred embodiment of the present invention, the magnitude of the power signal is observed. It is known that the power signal varies as an inverse square of the distance of the card to the reader. From this information, a data detection threshold is adjusted to enhance data recovery.

The present invention is described in terms of a preferred embodiment suitable for implementation in a monolithic low power data recovery circuit for use in a wireless powered communication device. It will be readily appreciated that the present invention has application beyond the preferred embodiments herein described which should be taken as illustrative rather than limiting.

Figure 1:
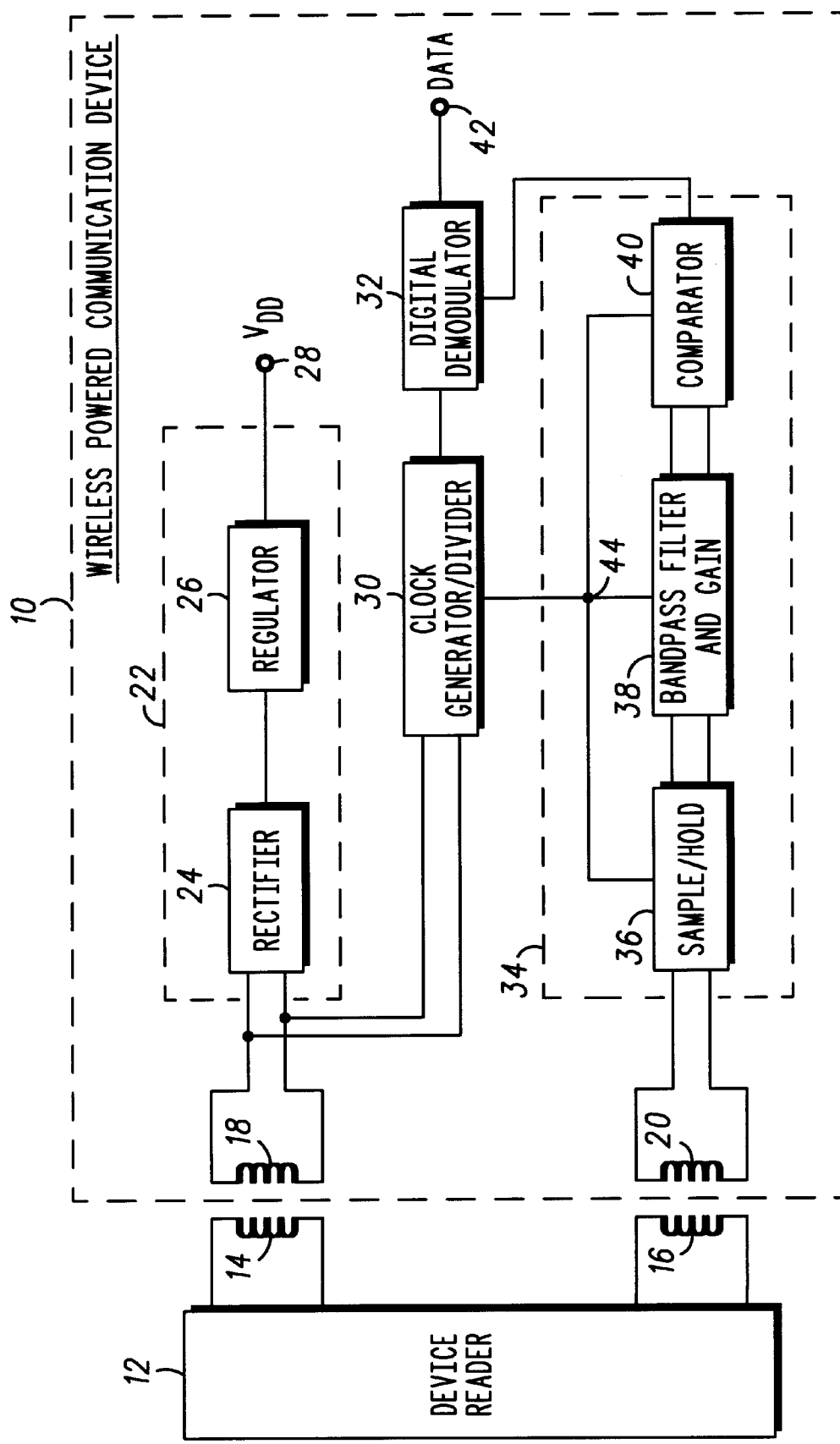
FIG. 1 is a block diagram representation of a wireless powered communication device and a wireless powered communication device reader in accordance with a preferred embodiment of the present invention.

Referring to FIG. 1 a wireless powered communication device 10 is shown in block diagram form and adjacent device reader 12. Device reader 12 is of conventional design and function and includes a power coil 14 and a data coil 16 for providing both a power carrier signal and a data carrier signal to device 10. Device 10 includes power and data coils, 18 and 20, respectively, for respectively receiving the power and data carrier signals. Device 10 further includes a power circuit 22 having a rectifier 24 and a voltage regulator 26 to provide a source of DC voltage 28 to device 10. Coupled to power coil 18 is a clock generation/divider circuit 30 which has a clock output to a digital demodulation circuit 32 and to data carrier recovery circuit 34. Clock circuit 30 is adapted to recover a clock signal from the power signal. Sampling clock 44 is preferably created by simply buffering the output of power coil 18 with an inverter. However, in some instances it may be advantageous to first divide the power coil output frequency, and then sample the data coil output with a divided form of the power signal. In this way, power consumption is further reduced.

Data recovery circuit 34 includes sampling circuit 36 coupled to filter and gain circuit 38 and comparator 40. Each of sampling circuit 36, filter 38 and comparator 40 are coupled to receive the clock output signal. The output of comparator 40 is coupled to digital demodulation circuit 32 which provides the original recovered data signal 42 output.

The power signal is generated within the reader and is inductively coupled to the device 10 by coil 18. The power signal on coil 18 is full wave rectified by rectifier 24 and then regulated by regulator 26 to the supply voltage 28. As described, a sampling clock frequency 44 is generated by clock circuit 30 from the power signal received at coil 18 and is communicated to both sampling circuit 36, filter 38 and comparator 40. Sampling circuit 36 samples the data signal at the frequency of the power signal with clock frequency 44. By sampling the data signal at a rate derived from the power signal, the power signal component seen on the data signal received at data coil 20 is aliased to DC and thereafter is easily rejected with filter 38. Filter 38 is therefore preferably a low order high pass filter or band pass filter.

Figure 2:
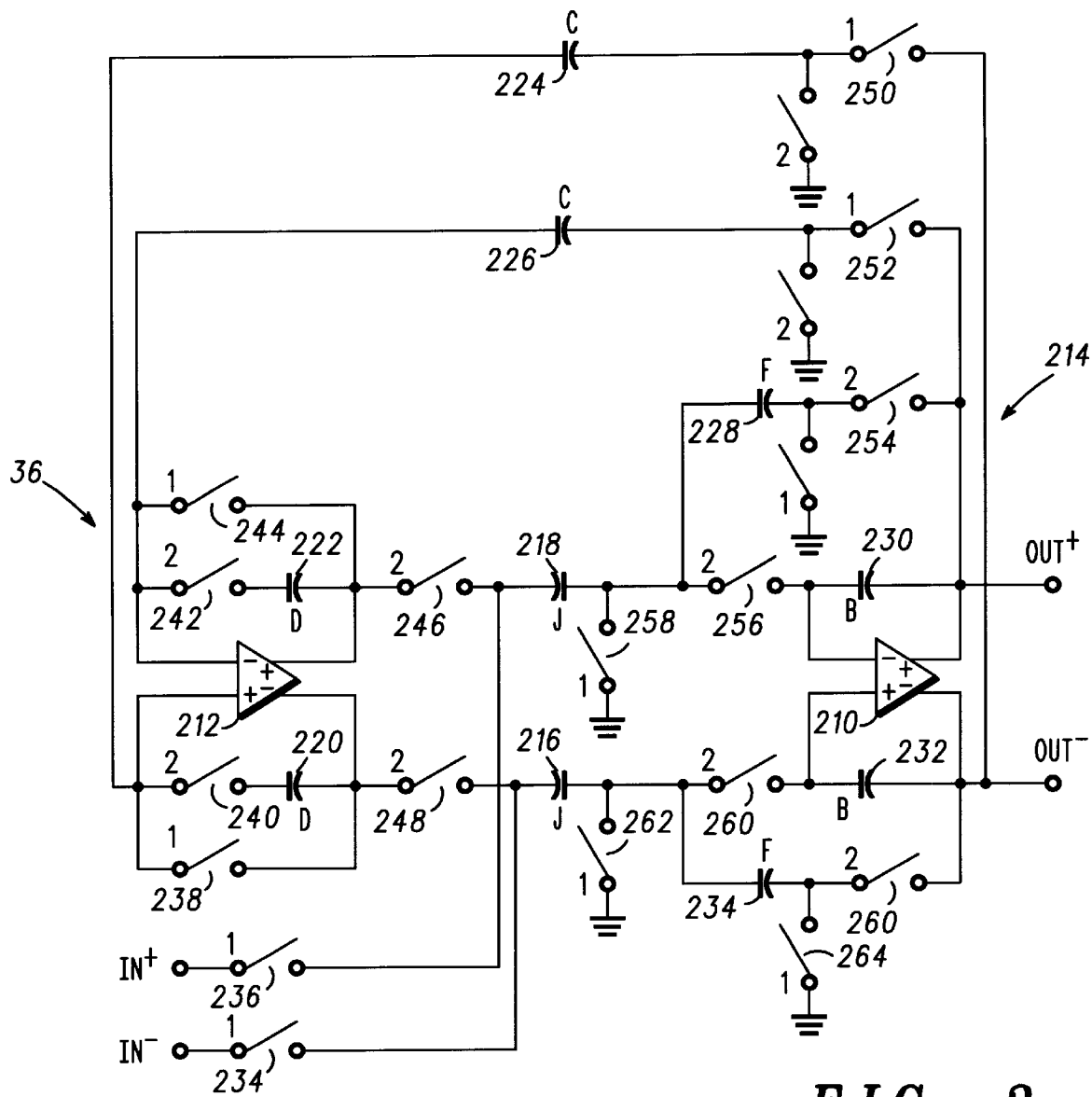
FIG. 2 is a circuit diagram of a sampling circuit in accordance with a preferred embodiment of the present invention.
Figure 3:
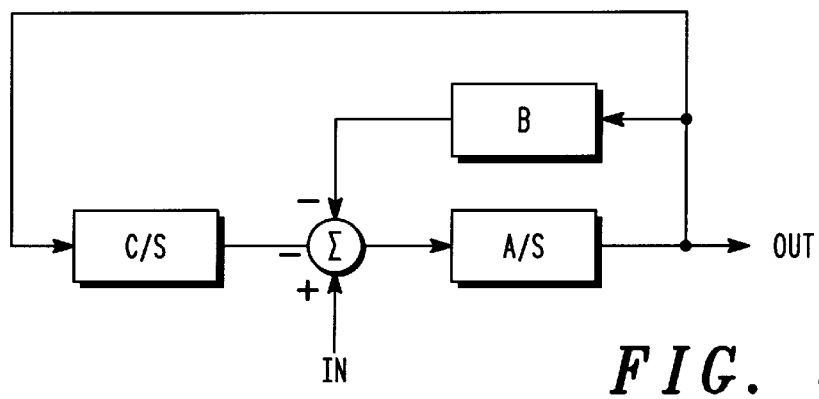
FIG. 3 is a transfer function representation of the sampling circuit illustrated in FIG. 2.

A preferred embodiment of the sampling circuit 36 is shown in FIG. 2. The circuit includes amplifiers 210 and 212 which are interconnected with the switched capacitor network 214 to create a biquadratic bandpass response. Switched capacitor network 214 includes capacitors 216–236 and switches 238–266. The equivalent s-domain transfer function for sampling circuit 36 is shown in block form in FIG. 3 and is:

$$\text{Out} = \text{In}\left[\frac{sA}{s^2 + BAs + CA}\right]. \tag{a}$$

The z-domain transfer function for the circuit shown in FIG. 2 is:

$$T(z) = \frac{(-DJ + DJz^{-1})}{[D(F+B) + (JC - DF - 2DB)z^{-1} + DBz^{-2}]} \tag{b}$$

With the preferred component values, the transfer function is:

$$T(z) = \left(\frac{-1.6487 + 1.6487z^{-1}}{1 + .76683 8z^{-2}}\right). \tag{c}$$

Sampling circuit 36 provides virtually complete rejection of the power signal component, as well as amplification of the desired data signal. The circuit also provides a transmission zero at DC and produces an output voltage with a zero DC component. A fully differential signal processing circuit is used to maximize the circuit's power supply rejection and substantially reject any residual component of the power signal which may appear at regulator 26.

Figure 4:
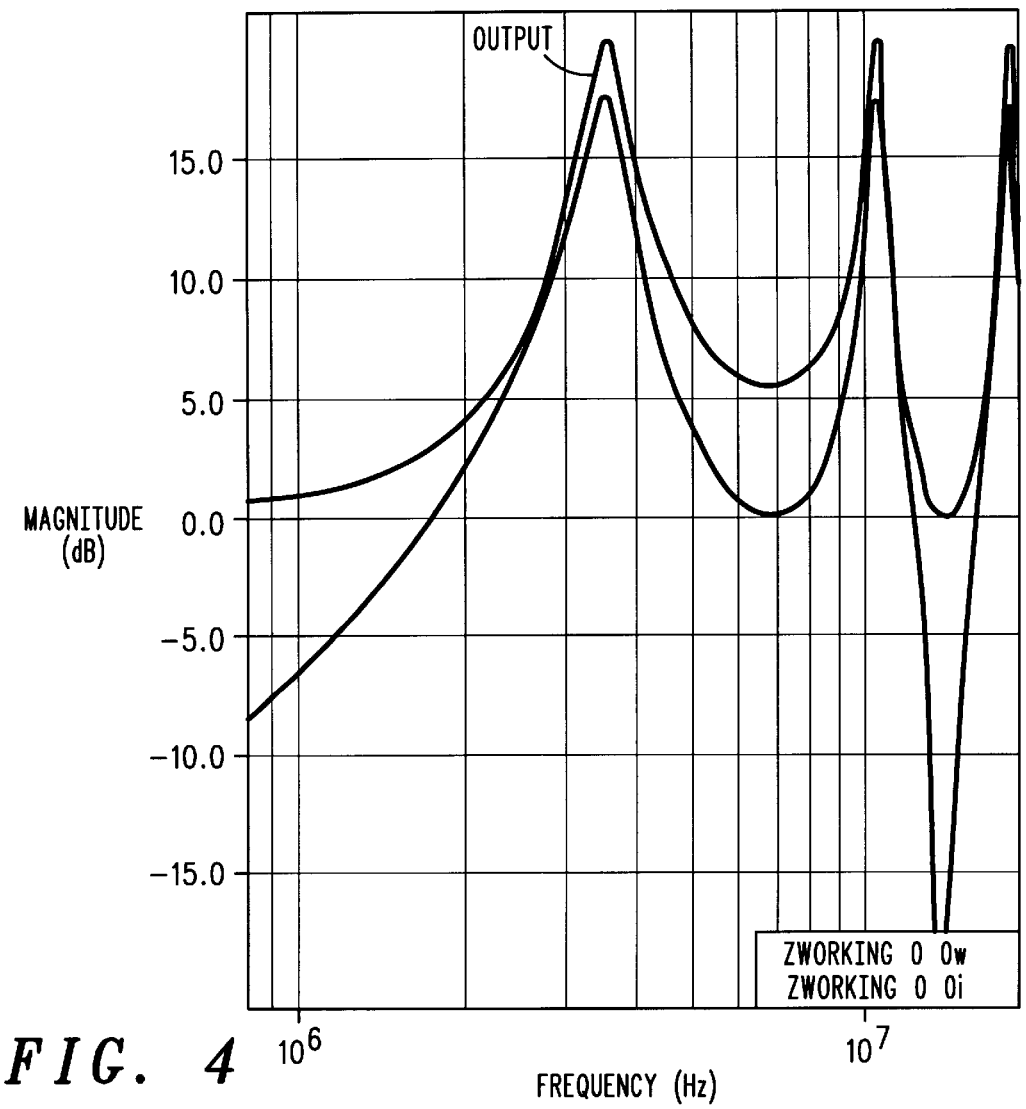
FIG. 4 is a chart illustrating the frequency response characteristic of the sampling circuit of FIG. 2.

The switched capacitor component values are chosen to produce a second order bandpass filter response centered at the carrier frequency. The 3 decibel (db) bandwidth is set equal to four times the data rate to produce a quality factor "Q" of 6 and provide approximately 20 db of amplification of the data carrier. The magnitude response of the circuit is shown in FIG. 4. The bandpass topology is structured to both maximize the gain applied to the desired data signal and concurrently minimize or zero the DC level at the output. Thus the bandpass filter structure provides an ability to provide gain more efficiently than using a high pass response. Bandpass response is also preferred as it rejects high frequency noise.

With further reference to FIG. 2, the signal received at the data coil is first sampled onto input capacitors 216 and 218 during one phase of the sampling clock. The switches shown in FIG. 2 represent toggle-switches driven by a two-phase clock having a phase one (1) and a phase two (2). In a preferred implementation metal-oxide field effect transistor (MOSFET) switches would be used as is well known in the art. Since the sampling clock signal 44 is derived from the power signal, the sampling clock is then synchronous with the power signal component appearing on the data signal. Consequently, each sample is taken during the same phase of each cycle of the power signal component. As a result, the input power signal component is converted to a constant DC level which is filtered by filter 38. For many applications the performance of sampling circuit 36 is independent of the phase relationship between the sampling clock and the power signal component which appears at the data coil output. However, to maximize performance for very high speed applications, one can optionally include a phase adjust circuit to adjust the phase of the sampling clock so that the samples are acquired when the slope of the power signal component is a minimum. Moreover, one may align the phase of the sampling clock so that samples are acquired when the power signal component on the voltage 28 is at a minimum. Note that FIG. 2 shows a configuration to sample data coil output without placing amplifiers in the input sampling path when the signal is sampled at the data coil output. This advantageously reduces the bandwidth required by the amplifiers used in the circuit. After the data signal has been sampled, the sampled data signal is then transferred to integrating amplifier 210 for amplification. As can be seen, amplifier 210 is configured to produce a zero DC component at the amplified output. A zero DC output component is produced by coupling the output of amplifier 210 into auto-zeroed integrating amplifier 212. An auto-zeroed arrangement for an integrating amplifier is shown and described in commonly assigned U.S. Pat. No. 4,802,236, issued Jan. 31, 1989, the disclosure of which is hereby expressly incorporated herein by reference. During steady state operation, the average DC charge coupled into the input of integrating amplifier 212 must equal zero. Since the only DC input to integrating amplifier 212 is the output of amplifier 210, the average DC output level of amplifier 210 must also equal zero as well.

Following signal conditioning, the data signal, which is ASK modulated, i.e., the carrier amplitude is switched between an on or an off value based on the state of the binary data, is amplitude discriminated by comparator 40. In a preferred implementation, a binary one is represented by presence of the carrier signal while a binary zero is represented by the absence of the carrier signal. Comparator 40 is designed to have a predetermined level of hysteresis set between the noise level and the carrier amplitude level. Comparator 40 output will toggle at the data carrier rate when a modulated binary one is received and will cease to toggle when a binary zero is received. This resulting signal is then easily digitally demodulated in digital demodulator 32, as is known in the art, for recovering the original source data stream. It may also be preferable to make the hysteresis level programmable to provide automatic gain control further increasing the range over which device 10 operates. It should be understood that while ASK modulation has been discussed, the present invention has application to any type of modulation.

Figure 5:
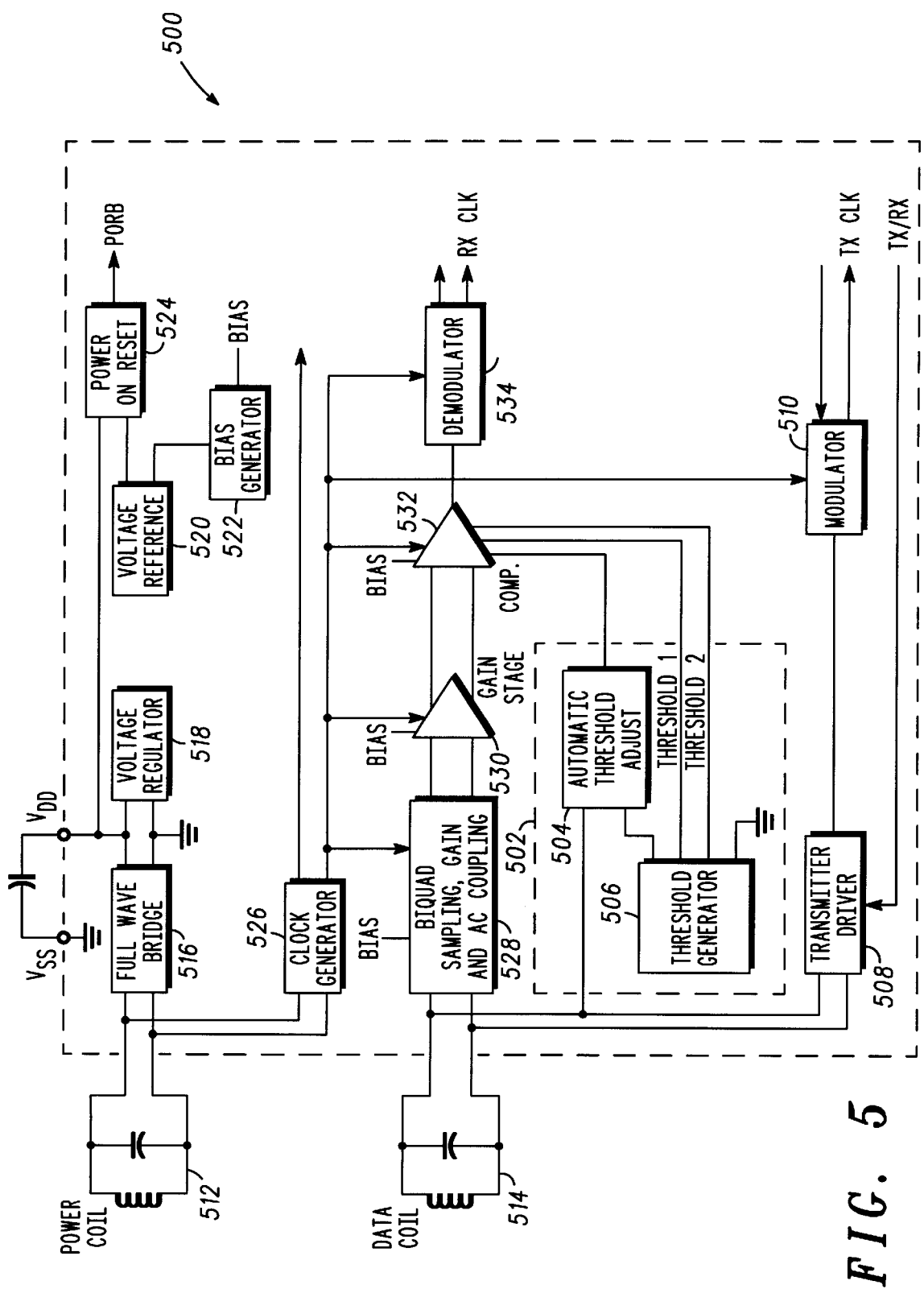
FIG. 5 is a block diagram of the communication device in accordance with an additional preferred embodiment of the present invention.

An additional preferred embodiment of the present invention is shown in FIG. 5 and includes a data detection threshold adjust circuit 502. As will be described, data detection parameters are adjusted in response to an estimated distance between the communication device 500 and the device reader (not shown in FIG. 5).

In general, device 500 operates as described above for receiving a communication signal including power signal and data signal components from a device reader. That is, the power signal portion is received at power coil 512 and processed through bridge 516, voltage regulator 518, power on reset 524, voltage reference 520 and bias generator 522 to provide a dc voltage, VDD, power on reset signal PORB, and a voltage bias BIAS for powering and operating device 500. Device 500 further includes a clock generator 526 adapted to sample the power signal and to generate a clock signal therefrom.

The data signal portion of the communication signal is received at data coil 514. The received signal is sampled by sampling circuit 528, amplified through filter/gain circuit 530 and threshold detected through comparator 532. The output of comparator 532 is coupled to digital demodulation circuit 534 where the data signal is demodulated. To this point, operation of data recovery portion of device 500 is the same as described above. Further shown associated with device 500 is modulator 510 and transmitter driver 508 for transmitting signals from device 500 to the device reader.

Device 500 further includes data detection threshold adjustment circuit 502. In the preferred embodiment comparator 532 includes at least two adjustable thresholds for data detection. It should be understood, however, that any number of thresholds, as practical, may be employed without departing from the scope of the present invention. Moreover, the present invention is described in terms of adjusting the data detection threshold. It should again be understood that any device operation parameter may be adjusted such as gain, filter parameters, signal characteristic detection parameters, to enhance data detection without departing from scope of the present invention.

Figure 6:
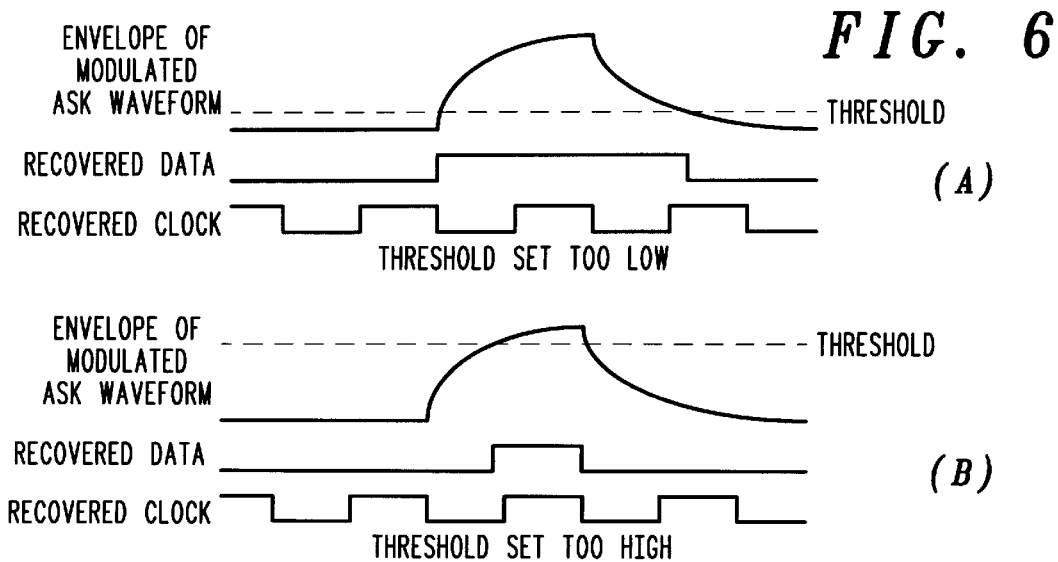
FIG. 6 is a graphical illustration of a pair of signal diagrams showing data detection.

Data detection is illustrated in FIG. 6. FIG. 6 shows an envelope of the ASK modulated data signal, the recovered data signal and the recovered clock signal. The detection threshold is illustrated in phantom and is set at various levels. For exemplary purposes threshold level "A" is shown set too low. This would be the case if a fixed threshold were employed, and device 500 is positioned closely adjacent the device reader resulting in a strong recovered data signal. The ramifications is that the decoded "1" extends into adjacent bits. In contrast, threshold level "B" is shown set too high. In this case the decoded "1" is too narrow and will not be properly clocked into the circuitry.

In the present invention, threshold adjustment circuit 502 acts to adjust the data detection threshold to compensate for instances when device is near or far from the device reader. In this manner a dynamic data detection threshold ensures that the data is accurately decoded. With reference once again to FIG. 5, automatic threshold adjust circuit 504 is coupled to the received data signal. As described above and in accordance with the present invention, the data signal is sampled in sampling circuit 528 such that substantially all power signal components are removed from the data signal. However, automatic threshold adjust circuit 504 samples the data signal before sampling and preferably detects the magnitude of the power signal present in the data signal although some other signal characteristics may be detected. The magnitude of this power signal component is indicative of the magnitude of the power signal and hence the distance of device 500 to the device reader. In response to this magnitude, threshold generator 506 selects from between a pair of detection thresholds a threshold which is coupled to comparator 532. It will again be appreciated that in the preferred implementation the power signal component magnitude is detected. Other signal characteristics indicative of the distance of device 500 to the device reader may be used without departing from the scope of the invention. Moreover, it may be desirable to detect a rate of change of the power signal magnitude which provides an indication of whether device 500 is moving towards or away from the device reader. This information is advantageously employed to restrict data transfer, such as a data write, to device 500 if it is determined that the device will not be near enough to the device reader long enough to complete the transaction.

Automatic threshold adjust circuit 504 compares the power signal on the data coil to a signal characteristic detection parameter, in the preferred embodiment a reference dc level created by threshold generator 506. If the power signal magnitude is greater than the reference dc level the larger threshold is detected. If it is below the reference dc level the lower threshold is selected. The threshold output of threshold generator 506 is coupled to comparator 532 for data detection as discussed above. As will be appreciated, a dead zone or hysteresis, is included to prevent unstable operation.

Figure 7:
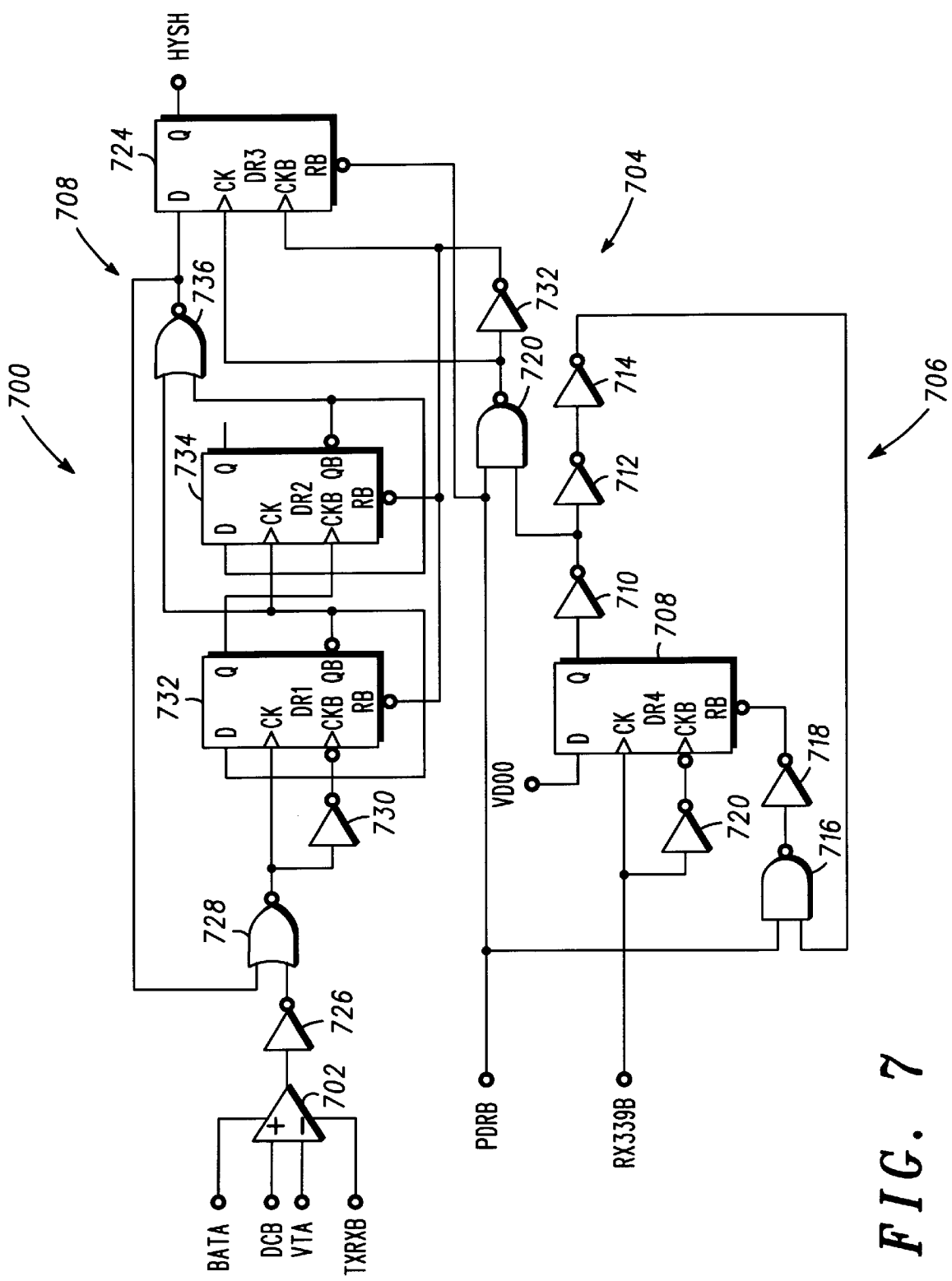
FIG. 7 is a schematic illustration of a data detection threshold adjustment circuit in accordance with a preferred embodiment of the present invention.

With reference to FIG. 7 circuit 700 compares the power signal magnitude to the reference dc level and operates as a digital filter to provide a stable adjust data detection threshold signal to threshold generator 506. In circuit 700, DCB is the signal from the data coil and consists of the data signal and the power signal component, BATA is a bias voltage signal for comparator 702, VTA is the reference dc level voltage from threshold generator 506, TXRXB is a turn-off during transmit mode signal to conserve energy, PORB is a power-on reset signal, RX339B is a 13.56 Mhz signal derived from the power signal and HYSH is the adjust data detection threshold signal. In operation, comparator 702 compares DCB and VTA to determine if a threshold change is in order. In the preferred embodiment illustrated comparator 702 is a single ended comparator, however, it may be advantageous to employ a differential comparator. When the power signal exceeds VTA, comparator 702 output will toggle at 13.56 Mhz, the frequency of the power signal in the present implementation.

The output of comparator 702 and RX339B are input to digital circuit 704. Digital Circuit 704 operates to remove noise by requiring a stable signal from comparator 702 for a predetermined period before transitioning the adjust data detection threshold signal HYSH and hence changing the data detection threshold. Digital circuit includes two circuit elements: reset signal generator circuit 706 and count-to-four circuit 708. Reset signal generator 706 includes flip-flop 708 having supply dc voltage, VDD, applied to its input and RX339B applied directly and via NOT 720 to its clock inputs. The output of flip-flop 708 is coupled via NOTs 710, 712, 714 and 718 and NAND 716 to provide a reset signal to flip-flop 708 every fourth cycle of RX339B, i.e. a 3.39 Mhz signal, and thereby reset flip-flop 708. Upon reset, the output signal from NOT 710, which transitions low on reset of flip-flop 708 and then high on the next cycle of RX339B, is applied via NAND 721 and NOT 722 to the clock inputs of output flip-flop 724.

Output of comparator 702 is coupled via NOT 726 to count-to-four circuit 708 that includes flip-flops 732 and 734 coupled in a count-to-four arrangement. Output of NOT 726 is coupled to NOR 728 which further is coupled to receive the output of NOR 736. The output NOR 728 is coupled directly and via NOT 730 to the clock inputs of flip-flop 732. The outputs of flip-flop 732 are coupled to the clock inputs of flip-flop 734. Also, the NOT output of flip-flop 732 is further coupled to NOR 736 and to the input of flip-flop 732. The NOT output of flip-flop 734 is similarly coupled to its input and to NOR 736. The resets of each of flip-flops 732 and 734 are coupled to the output of NOT 722 of reset signal generator 706. Finally, the output of flip-flop 736 is coupled to the input of flip-flop 724.

In operation, output of flip-flop 724 will follow the output of NOR 736 on the reset signal from reset signal generator 706. Output of NOR 736 will be high if DCB remains above VTA during the reset period. That is, if DCB is above VTA the output of comparator 702 will cycle at 13.56 Mhz the power signal frequency. This will cause flip-flops 732 and 734 of count-to-four circuit 708 to count, beginning at one to four according to Table 1, below. Counting only occurs if DCB is above VTA and on reset, count-to-four circuit 708 is reset to one. At four, the NOT outputs of flip-flops 732 and 734 are each high and hence, output of NOR 736 is high. Concomitantly, the reset signal from reset signal generator 706 clocks flip-flop 724, and its output transitions high. As will be further appreciated, should DCB fall below VTA, count-to-four circuit 708 will not reach four. Each of the NOT outputs of flip-flops 732 and 734 will not be high and the output of NOR 736 will be low. On the reset signal, this low will be clocked into flip-flop 724, and its output will either remain or transition low.

TABLE 1

| | Flip-Flops 732 and 734 States | |
|---|---|---|
| | Flip-Flop 734 Qb | Flip-Flop 732 Qb |
| 1 | 0 | 0 |
| 2 | 0 | 1 |
| 3 | 1 | 0 |
| 4 | 1 | 1 |

A high output of flip-flop 724, i.e., a high adjust data detection threshold signal, will cause threshold generator 506 to output to comparator 532 the high data detection threshold. Similarly, a low output of flip-flop 724, i.e., a low adjust data detection threshold signal, will cause threshold generator 506 to output to comparator 532 the low data detection threshold. Note that in the preferred embodiment the low data detection signal is preferred in that it will be selected unless the magnitude of the power signal exceeds a threshold for a time period. Once selected, however, the high data detection threshold will be retained until the next reset signal in order to prevent excessive cycling of the data detection threshold. It should be appreciated that a preference for the high data detection threshold or no preference for either threshold may be implemented without departing from the fair scope of the present invention. The preferred embodiment has been described as selecting between one of two data detection thresholds, it will be appreciated that any number of thresholds may be implemented. In addition, a single signal reference is provided in the preferred embodiment for comparison of the power signal magnitude for data detection threshold adaptation. A number of references may be employed, and for example, two references may be employed such that the high threshold is selected when the power signal magnitude exceeds a high reference for a period of time and the low threshold is selected when the power signal magnitude is below a second reference for a period of time.

Figure 8:
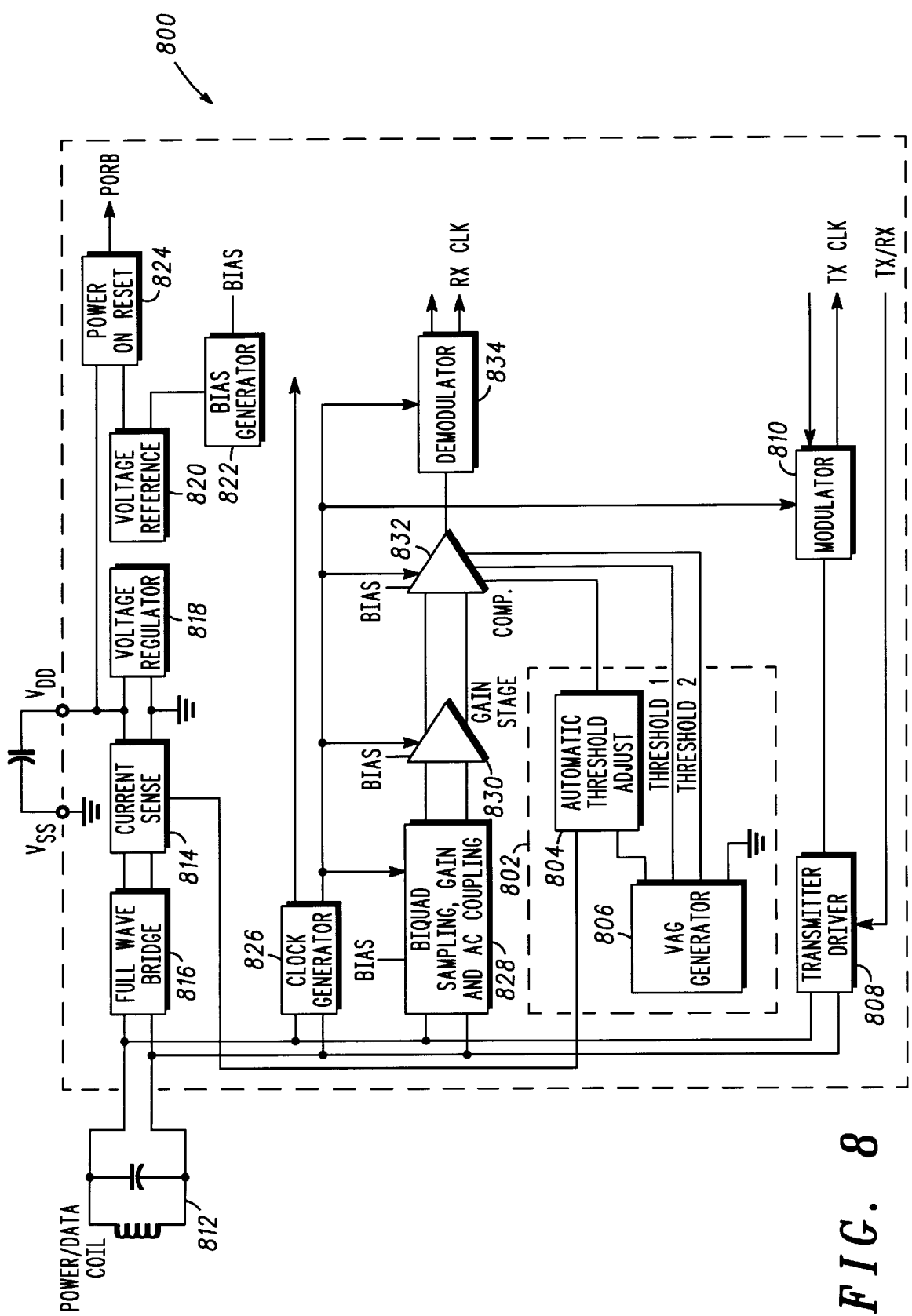
FIG. 8 is a block diagram of the communication device in accordance with an additional preferred embodiment of the present invention.

Referring now to FIG. 8, a single coil communication device 800 is shown. In this arrangement a single coil 812 is used to receive both the power and data signal components of the communication signal. The received communication signal is processed through bridge 816, voltage regulator 818, power on reset 824, voltage reference 820 and bias generator 822 to provide a d.c. voltage, VDD, power on reset signal PORB, and a voltage bias BIAS for powering and operating device 800. Device 800 further includes a clock generator 826 adapted to sample the communication signal and to generate a clock signal therefrom.

The communication signal is further coupled to a data recover portion of device 800. The received communication signal is sampled by sampling circuit 828, amplified through filter/gain circuit 830 and threshold detected through comparator 832. The output of comparator 832 is coupled to digital demodulation circuit 834 where the data signal is demodulated. To this point, operation of data recovery portion of device 800 is the same as described above for sampling the communication signal for data recovery utilizing the clock signal derived from the power signal for superior power signal noise rejection. Further shown associated with device 800 is modulator 810 and transmitter driver 808 for transmitting signals from device 800 to the device reader via coil 812.

Device 800 further includes data detection threshold adjustment circuit 802. As described above, comparator 832 includes at least two adjustable thresholds for data detection while it is understood that any number of thresholds, as practical, may be employed without departing from the scope of the present invention. The current sense circuit 814 coupled to the power signal recovery portion of device 800 provides a current sense signal respective of the current within the power signal recovery portion of device 800 to automatic threshold adjust circuit 804 which operates as described with respect to automatic threshold adjust circuit 504 to provide a threshold adjust signal to threshold generator 806. It should be understood that the current draw of the entire device or the generated supply voltage may be sensed by automatic threshold adjust circuit 804 for determining location of device 800 to the reader and hence adjusting the data detection threshold. Threshold generator 804 operates as described with respect to threshold generator 506 to, based upon the threshold adjust signal, provide a data detection threshold signal to comparator 832 for data recovery.

While a preferred embodiment of the invention has been described in the above detailed description and illustrated in the accompanying drawings, the invention is not limited thereto but only by the scope and spirit of the appended claims.

We claim:

1. In a wireless powered communication apparatus having a power coil and a data coil and wherein a receiver station provides a power signal at a power carrier frequency and a modulated data signal containing a data signal modulated at a data carrier frequency, the wireless powered communication apparatus being adapted to receive the power signal from the power coil and the modulated data signal from the data coil, a method for recovering the data signal from the modulated data signal comprising the steps of:

generating a power source from the power signal;

applying the power source to a data recovery circuit;

sampling the modulated data signal within the data recovery circuit to recover the data signal;

detecting a characteristic of the power signal present in the modulated data signal, the modulated data signal being received by the data coil; and adjusting a data recovery parameter of the data recovery circuit in response to the characteristic.

2. The method of claim 1 wherein the characteristic comprises a magnitude of the power signal.

3. The method of claim 1 wherein the data recovery parameter comprises one of: a signal detection threshold, a gain, a filter parameter, a bias voltage value, and a signal detection characteristic detection parameter.

4. The method of claim 1 further comprising the step of modifying the data signal in response to the characteristic.

5. The method of claim 4 wherein the step of modifying the data signal comprises one of inhibiting a data transmission and initiating a data transmission.

6. A wireless powered communication apparatus having a power coil and a data coil and wherein a receiver station provides a power signal at a power carrier frequency and a modulated data signal containing a data signal modulated at a data carrier frequency, the wireless powered communication apparatus being adapted to receive the power signal from the power coil and the modulated data signal from the data coil, the wireless powered communication apparatus arranged for recovering the data signal from the modulated data signal, the wireless powered communication apparatus comprising:

generating means for generating a power source from the power signal;

applying means for applying the power source to a data recovery circuit;

sampling means for sampling the modulated data signal within the data recovery circuit to recover the data signal;

detecting means for detecting a characteristic of the power signal present in the modulated data signal, the modulated data signal being received by the data coil; and adjusting means for adjusting a data recovery parameter of the data recovery circuit in response to the characteristic.

7. The wireless powered communication apparatus of claim 6 wherein the characteristic comprises a magnitude of the power signal.

8. The wireless powered communication apparatus of claim 6 wherein the data recovery parameter comprises one of: a signal detection threshold, a gain, a filter parameter, a bias voltage value, and a signal detection characteristic detection parameter.

9. The wireless powered communication apparatus of claim 6 further comprising modifying means for modifying the data signal in response to the characteristic.

10. The wireless powered communication apparatus of claim 9 wherein the modifying means comprises one of means for inhibiting a data transmission and means for initiating a data transmission.

11. A wireless powered communication apparatus comprising:

a power coil for receiving a power signal at a power carrier frequency;

a data coil for receiving a modulated data signal containing a data signal modulated at a data carrier frequency;

a power generating circuit coupled to the power coil and further being coupled to a rectifier and a regulator providing a direct-current power supply;

a data recovery circuit coupled to the data coil, the data recovery circuit comprising a sampling circuit coupled to the data coil, the sampling circuit having a sampled data signal output;

an adjustable threshold detect comparator coupled to the sampling circuit and arranged to receive the sampled data signal output and having a modulated data signal output;

a demodulator coupled to receive the modulated data signal output and having a demodulated data signal output; and a comparator threshold adjust circuit coupled to the adjustable threshold detect comparator and to the data coil, the comparator threshold adjust circuit being arranged for detecting a characteristic of the power signal present in the modulated data signal, the modulated data signal being received by the data coil.

12. The wireless powered communication apparatus of claim 11 wherein the comparator threshold adjust circuit comprises a power signal level detection circuit.

13. The wireless powered communication apparatus of claim 12 wherein the adjustable threshold detect comparator is adjusted in response to a magnitude of the power signal.

14. The wireless powered communication apparatus of claim 12 wherein the adjustable threshold detect comparator includes an adjusted operating parameter selected from the group of: a signal detection threshold, a gain, a filter parameter, a bias voltage value, and a signal detection characteristic detection parameter.

15. The wireless powered communication apparatus of claim 12 wherein the comparator threshold adjust circuit comprises:

a power signal level comparator which compares a voltage level of the power signal present in the modulated data signal to a reference dc level, thus forming a power signal level comparator output, the modulated data signal being received by the data coil;

a first digital counter circuit which detects and counts transitions of the power signal level comparator output, thus forming a first count;

a second digital counter circuit which detects and counts transitions of the power signal, thus forming a second count, the power signal being received by the power coil, a digital comparator which compares the first count to the second count, thus forming a digital comparator output; and a control signal which determines the threshold of the adjustable threshold comparator based on the digital comparator output.

16. The wireless powered communication apparatus of claim 12 wherein the power signal level comparator employs a majority polling procedure to ensure that the power signal level comparator output is stable.

* * * * *